US012565268B2

(12) United States Patent
Maeda

(10) Patent No.: US 12,565,268 B2
(45) Date of Patent: Mar. 3, 2026

(54) VEHICLE BODY STRUCTURE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 18/348,373

(22) Filed: Jul. 7, 2023

(65) Prior Publication Data

US 2024/0067270 A1 Feb. 29, 2024

(30) Foreign Application Priority Data

Aug. 26, 2022 (JP) ................................. 2022-135049

(51) Int. Cl.
| | |
|---|---|
| *B62D 21/15* | (2006.01) |
| *B60R 16/04* | (2006.01) |
| *B62D 25/02* | (2006.01) |
| *B62D 25/04* | (2006.01) |

(52) U.S. Cl.
CPC ............ *B62D 21/157* (2013.01); *B60R 16/04* (2013.01); *B62D 25/025* (2013.01); *B62D 25/04* (2013.01)

(58) Field of Classification Search
CPC .... B62D 21/157; B62D 25/025; B62D 24/04; B60R 16/04
USPC ...................................................... 296/187.12
See application file for complete search history.

(56) References Cited

U.S. PATENT DOCUMENTS

| | | | | |
|---|---|---|---|---|
| 12,280,829 | B2 * | 4/2025 | Song ...................... | B62D 25/02 |
| 12,415,569 | B2 * | 9/2025 | Kuipers .............. | B62D 21/157 |
| 2017/0267290 | A1 | 9/2017 | Ayuzawa et al. | |
| 2019/0047629 | A1 | 2/2019 | Asa | |
| 2022/0250684 | A1 | 8/2022 | Renegar | |
| 2023/0140939 | A1 * | 5/2023 | Baiju ..................... | B62D 25/04 |
| | | | | 296/187.02 |
| 2023/0145164 | A1 * | 5/2023 | Kang ...................... | B60K 1/04 |
| | | | | 180/68.5 |
| 2023/0147528 | A1 * | 5/2023 | Qin ...................... | B62D 21/157 |
| | | | | 296/209 |

FOREIGN PATENT DOCUMENTS

| | | |
|---|---|---|
| JP | H04-005181 A | 1/1992 |
| JP | H04-143174 A | 5/1992 |
| JP | 2014-129088 A | 7/2014 |
| JP | 6150365 B2 | 6/2017 |
| JP | 2019-034600 A | 3/2019 |
| JP | 2022-534601 A | 8/2022 |

* cited by examiner

*Primary Examiner* — Taras P Bemko
(74) *Attorney, Agent, or Firm* — SOLARIS Intellectual Property Group, PLLC

(57) ABSTRACT

A vehicle body structure includes a rocker configuring a portion at an outer side, in a vehicle width direction, of a vehicle body lower section. The rocker extends in a vehicle front-rear direction. The vehicle body structure also includes a metal center pillar, which is a separate component from the rocker. A lower section in a vehicle up-down direction of the center pillar is detachably attached to the rocker by an attachment member.

8 Claims, 10 Drawing Sheets

VEHICLE BODY STRUCTURE

CROSS-REFERENCE TO RELATED APPLICATION

This application is based on and claims priority under 35 USC 119 from Japanese Patent Application No. 2022-135049, filed on Aug. 26, 2022, the entire disclosure of which is incorporated by reference herein.

BACKGROUND OF THE INVENTION

Technical Field

The present disclosure relates to a vehicle body structure.

Related Art

Japanese Patent No. 6150365 discloses an invention relating to an automotive vehicle body. In this automotive vehicle body, a lower end section of a center pillar is connected to a side sill (rocker) of a vehicle body frame, which is configured as a separate component from the center pillar, via a fastening member.

In order to enable the center pillar of the vehicle body to be replaced, it is preferable that the center pillar be configured to be detachable from other members, as in the related art described above. Further, from the standpoint of effective utilization of resources, it is preferable that the center pillar that has been detached from the vehicle body, and the materials configuring the center pillar, be easy to reuse.

However, in the related art described above, a main portion of the center pillar is configured by a carbon fiber reinforced resin, making it difficult to repair the center pillar or reuse the material configuring the center pillar.

SUMMARY

In consideration of the above facts, the present disclosure obtains a vehicle body structure that enables replacement of a center pillar to be easily carried out, and also enables reuse of the center pillar that has been detached from the vehicle body, and of materials configuring the center pillar, to be easily carried out.

A vehicle body structure according to a first aspect of the present disclosure includes: a rocker that configures a portion at an outer side, in a vehicle width direction, of a vehicle body lower section, the rocker extends in a vehicle front-rear direction; and a metal center pillar, which is a separate component from the rocker, a lower section at a lower side in a vehicle up-down direction of the center pillar being detachably attached to the rocker by an attachment member.

According to the vehicle body structure of the first aspect, the portion at the vehicle width direction outer side of the vehicle body lower section is configured by the rocker, and the rocker extends in the vehicle front-rear direction.

Further, the center pillar is a separate component from the rocker, and the lower section of the center pillar is detachably attached to the rocker. Consequently, the center pillar can be detached from the vehicle body lower section.

In a case such as when a main portion of the center pillar is configured by a carbon fiber reinforced resin, it is difficult to repair the center pillar or reuse the material configuring the center pillar.

In the present aspect, the center pillar is made of metal, and it is possible to perform welding work with respect to the center pillar and to melt the members configuring the center pillar. Consequently, the center pillar can be easily repaired, and new members can be easily manufactured from the material forming the center pillar, as compared to a configuration in which the center pillar is configured from a material that is difficult to reuse, such as a carbon fiber reinforced resin or the like.

A vehicle body structure according to a second aspect of the present disclosure is the vehicle body structure according to the first aspect, wherein a cross-sectional shape of the rocker seen in the vehicle front-rear direction is a closed cross-section, and the vehicle body structure further includes a width direction supporting section that is disposed at an inside of the rocker, and the width direction supporting section includes a penetrating section extending in the vehicle width direction. The lower section of the center pillar includes an outer side wall section positioned at an outer side, in the vehicle width direction, of the rocker, and an inner side wall section positioned at an inner side, in the vehicle width direction, of the rocker. The rocker and the lower section of the center pillar are connected, in the vehicle width direction, by a width direction attachment member serving as the attachment member, the width direction attachment member is inserted through an outer side insertion section provided at the outer side wall section, an inner side insertion section provided at the inner side wall section, and the penetrating section of the width direction supporting section.

According to the vehicle body structure of the second aspect, the cross-sectional shape of the rocker seen in the vehicle front-rear direction is a closed cross-section, and the width direction supporting section includes the penetrating section that extends in the vehicle width direction, and the penetrating section is disposed at the inside of the rocker.

The lower section of the center pillar includes the outer side wall section positioned at the vehicle width direction outer side of the rocker, and the inner side wall section positioned at the vehicle width direction inner side of the rocker.

Further, the rocker and the lower section of the center pillar are connected, in the vehicle width direction, by the width direction attachment member, which is inserted through the outer side insertion section provided at the outer side wall section of the center pillar, the inner side insertion section provided at the inner side wall section, and the penetrating section of the width direction supporting section. Consequently, connection points between the rocker and the center pillar can be consolidated in the vehicle width direction, and the rocker and the center pillar can be connected to each other without performing work for connecting the rocker and the center pillar at both the vehicle width direction outer side and the vehicle width direction inner side.

A vehicle body structure according to a third aspect of the present disclosure is the vehicle body structure according to the second aspect, wherein the width direction supporting section is configured as a shock absorbing member that is capable of absorbing a collision load in the vehicle width direction, and the width direction supporting section is configured to be disposed at a position overlapping with a battery pack, which is disposed at an inner side in the vehicle width direction of the rocker, when seen in the vehicle width direction.

According to the vehicle body structure of the third aspect, the shock absorbing member that is capable of absorbing a collision load in the vehicle width direction is disposed at the inside of the rocker. The battery pack is disposed at the vehicle width direction inner side of the rocker, and the shock absorbing member is disposed at a position overlapping with the battery pack when seen in the vehicle width direction.

When a collision load in the vehicle width direction is input to the vehicle body, before the collision load is input to the battery pack, at least a portion of the collision load is absorbed by the shock absorbing member.

A vehicle body structure according to a fourth aspect of the present disclosure is the vehicle body structure according to any one of the first aspect to the third aspect, which further includes an up-down direction supporting section that is disposed at an inside of the rocker, and at which a penetrating section extending in the vehicle up-down direction is formed, wherein an upper side wall section positioned at an upper side of the rocker is provided at the lower section of the center pillar. The rocker and the lower section of the center pillar are connected, in the vehicle up-down direction, by an up-down direction attachment member serving as the attachment member, the up-down direction attachment member is inserted through an upper side insertion section provided at the upper side wall section and the penetrating section.

According to the vehicle body structure of the fourth aspect, the up-down direction supporting section is disposed at the inside of the rocker, and the penetrating section extending in the vehicle up-down direction is formed at the up-down direction supporting section.

The upper side wall section positioned at the upper side of the rocker is provided at the lower section of the center pillar, and the upper side insertion section is provided at the upper side wall section.

Further, the rocker and the lower section of the center pillar are connected, in the vehicle up-down direction, by the up-down direction attachment member, which is inserted through the upper side insertion section and the penetrating section of the up-down direction supporting section.

The connection points between the rocker and the center pillar can be consolidated in the vehicle up-down direction, and the rocker and the center pillar can be connected to each other without performing work for connecting the rocker and the center pillar at both the vehicle upper side and the vehicle lower side.

A vehicle body structure according to a fifth aspect of the present disclosure is the vehicle body structure according to the third aspect, wherein the width direction attachment member is configured to connect the battery pack to the rocker.

A vehicle body structure according to a sixth aspect of the present disclosure is the vehicle body structure according to the fourth aspect, wherein the up-down direction supporting section is configured as a shock absorbing member.

As explained above, in the vehicle body structure according to the first aspect of the present disclosure, the center pillar can be easily replaced, and the center pillar that has been detached from the vehicle body, and the materials configuring the center pillar, can be easily reused.

In the vehicle body structure according to the second aspect of the present disclosure, when the vehicle body is configured such that the center pillar and the rocker are connected in the vehicle width direction, the number of man-hours for assembly of the vehicle body can be reduced.

In the vehicle body structure according to the third aspect of the present disclosure, the battery pack disposed at a lower section side of the vehicle body can be protected from a collision load in the vehicle width direction.

In the vehicle body structure according to the fourth aspect of the present disclosure, when the vehicle body is configured such that the center pillar and the rocker are connected in the vehicle up-down direction, an increase in the number of man-hours for assembly of the vehicle body can be suppressed.

In the vehicle body structure according to the fifth aspect of the present disclosure, since the battery pack is connected to the rocker, the battery pack can be enlarged in the vehicle width direction and a capacity of the battery pack can be secured.

In the vehicle body structure according to the sixth aspect of the present disclosure, in a case in which a collision load in the vehicle p-down direction is input to the vehicle body, at least a portion of the collision load is absorbed by the shock absorbing member, and the center pillar and the rocker are connected rigidly.

BRIEF DESCRIPTION OF THE DRAWINGS

Embodiments of the present invention will be described in detail based on the following figures, wherein.

DESCRIPTION

First Exemplary Embodiment

Figure 1:
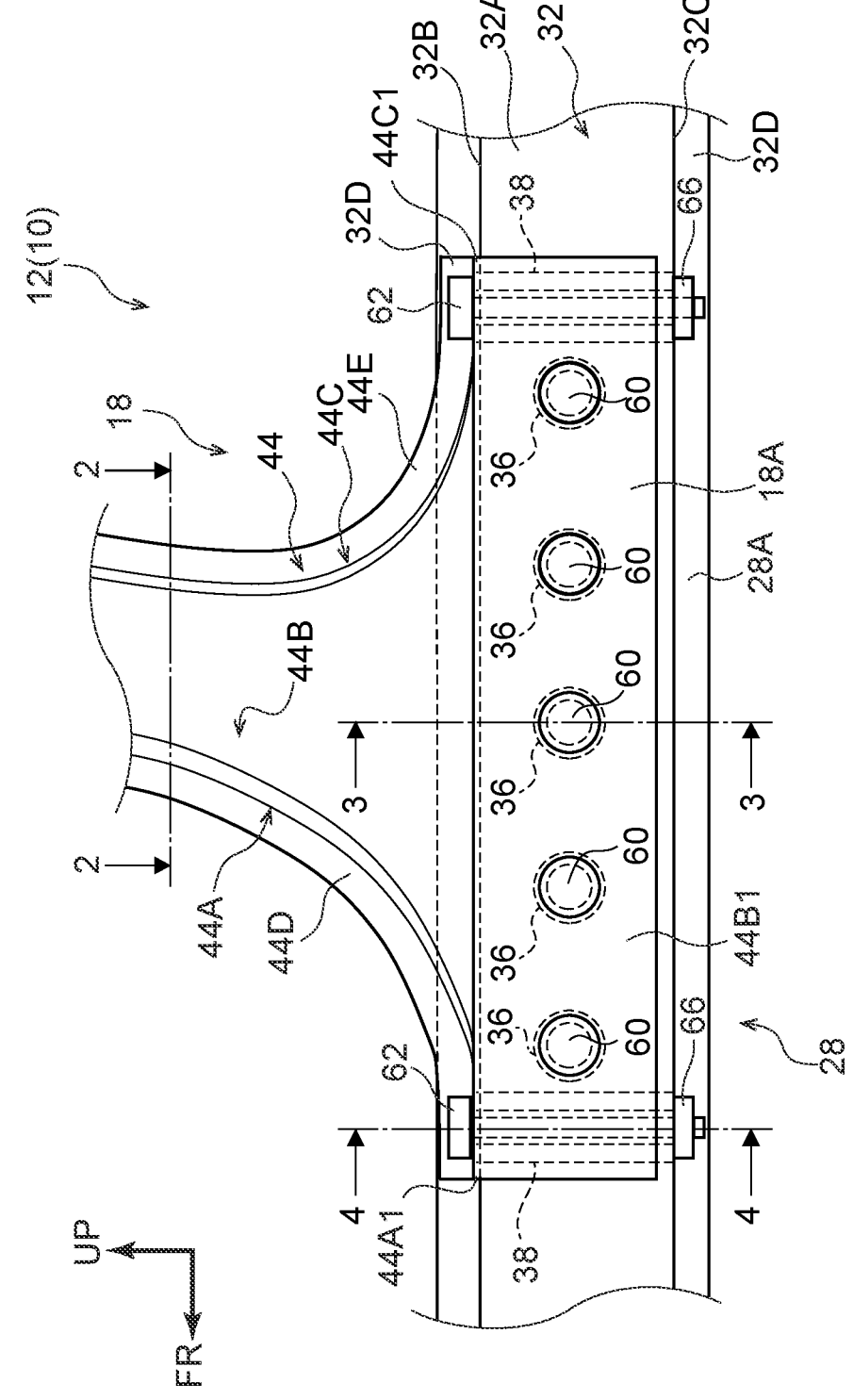
FIG. 1 is a side view (view in a direction of arrow 1 in FIG. 2) illustrating a configuration of connection points between a center pillar and a rocker in a vehicle body to which a vehicle body structure according to a first exemplary embodiment has been applied.

Explanation follows regarding an example of an exemplary embodiment of a vehicle body structure according to the present disclosure, with reference to FIG. 1 to FIG. 5. It should be noted that arrow FR appropriately illustrated in the drawings indicates a vehicle front side, arrow UP indicates a vehicle upper side, and arrow OUT indicates a vehicle width direction outer side.

Figure 5:
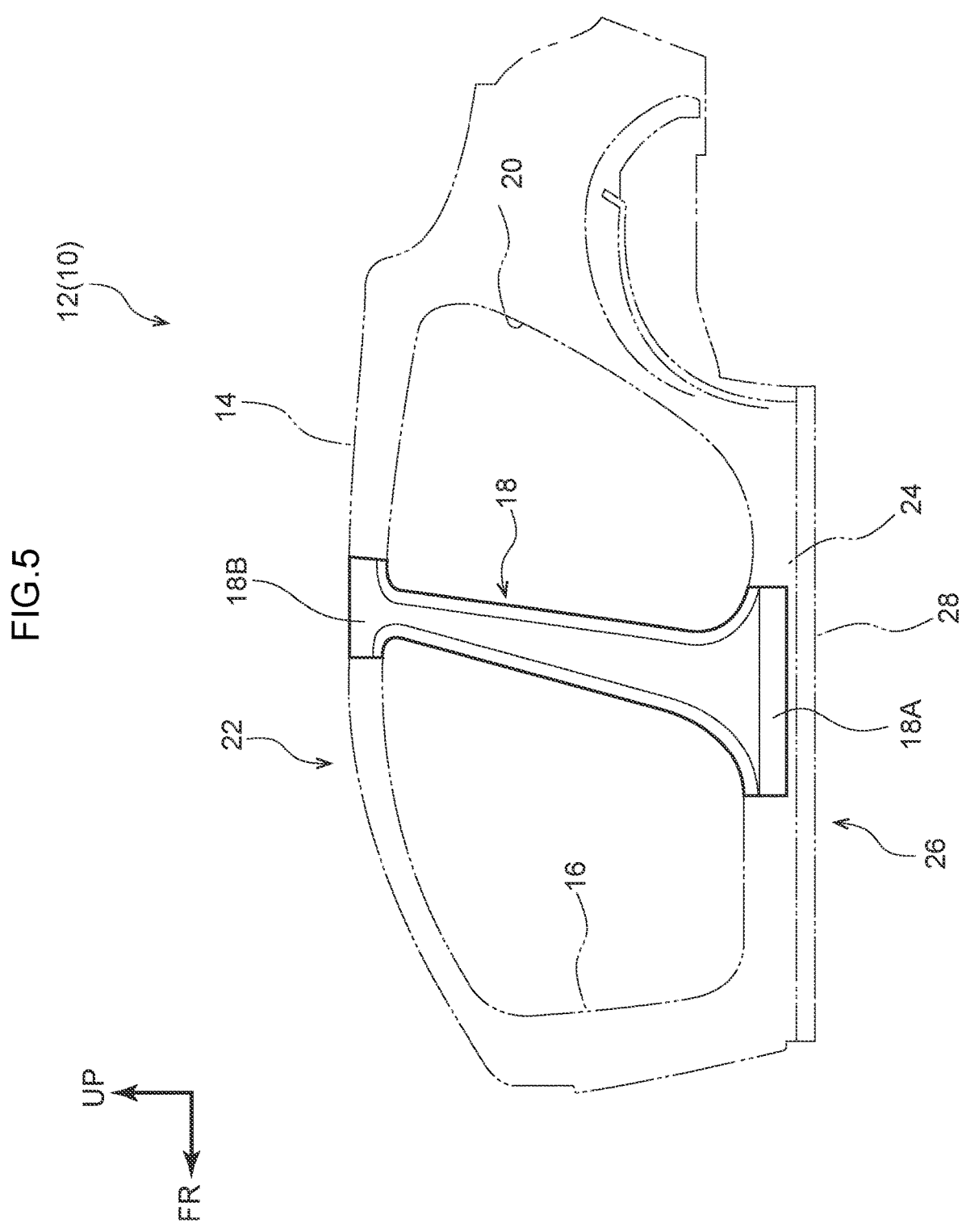
FIG. 5 is a side view illustrating a configuration of the vehicle body to which the vehicle body structure according to the first exemplary embodiment has been applied.
Figure 6:
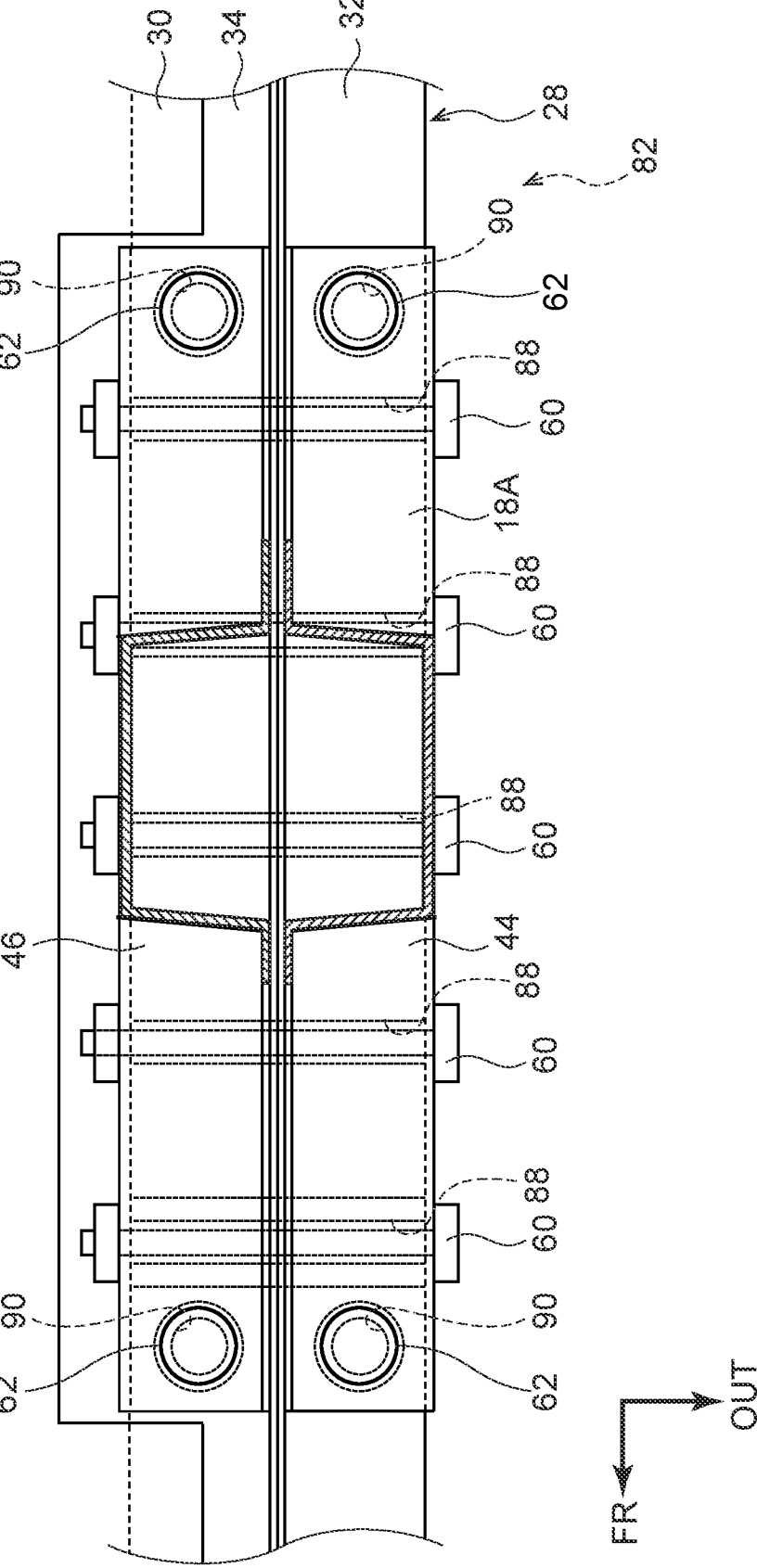
FIG. 6 is a cross-sectional view corresponding to FIG. 2, seen from the vehicle upper side, illustrating a configuration of connection points between a center pillar and a rocker in a vehicle body to which a vehicle body structure according to a second exemplary embodiment has been applied.

First, explanation follows regarding a schematic configuration of a vehicle body 12 of a vehicle 10 to which the vehicle body structure according to the present exemplary embodiment has been applied, with reference to FIG. 5. It should be noted that, in the present exemplary embodiment, since the vehicle body 12 is basically configured in a bilaterally symmetrical manner, explanation follows mainly regarding a configuration of a portion at a left side in a width direction of the vehicle body 12, while explanation regarding a configuration of a portion on a right side in the width direction is appropriately omitted.

The vehicle body 12 is configured by a body upper portion 22 configured to include a roof section 14, a front pillar 16, a center pillar 18, and a rear pillar 20, and a body lower portion 26 configured to include a floor section 24 serving as a vehicle body lower section, being detachably connected together.

Further, the present exemplary embodiment is characterized by a configuration of connection points between the center pillar 18 and a rocker 28 configuring a portion of the floor section 24. The configuration of the vehicle body 12 will be described in detail below focusing on configurations of the center pillar 18, the rocker 28, and portions at the periphery thereof, which configure the main portion of the present exemplary embodiment.

Figure 3:
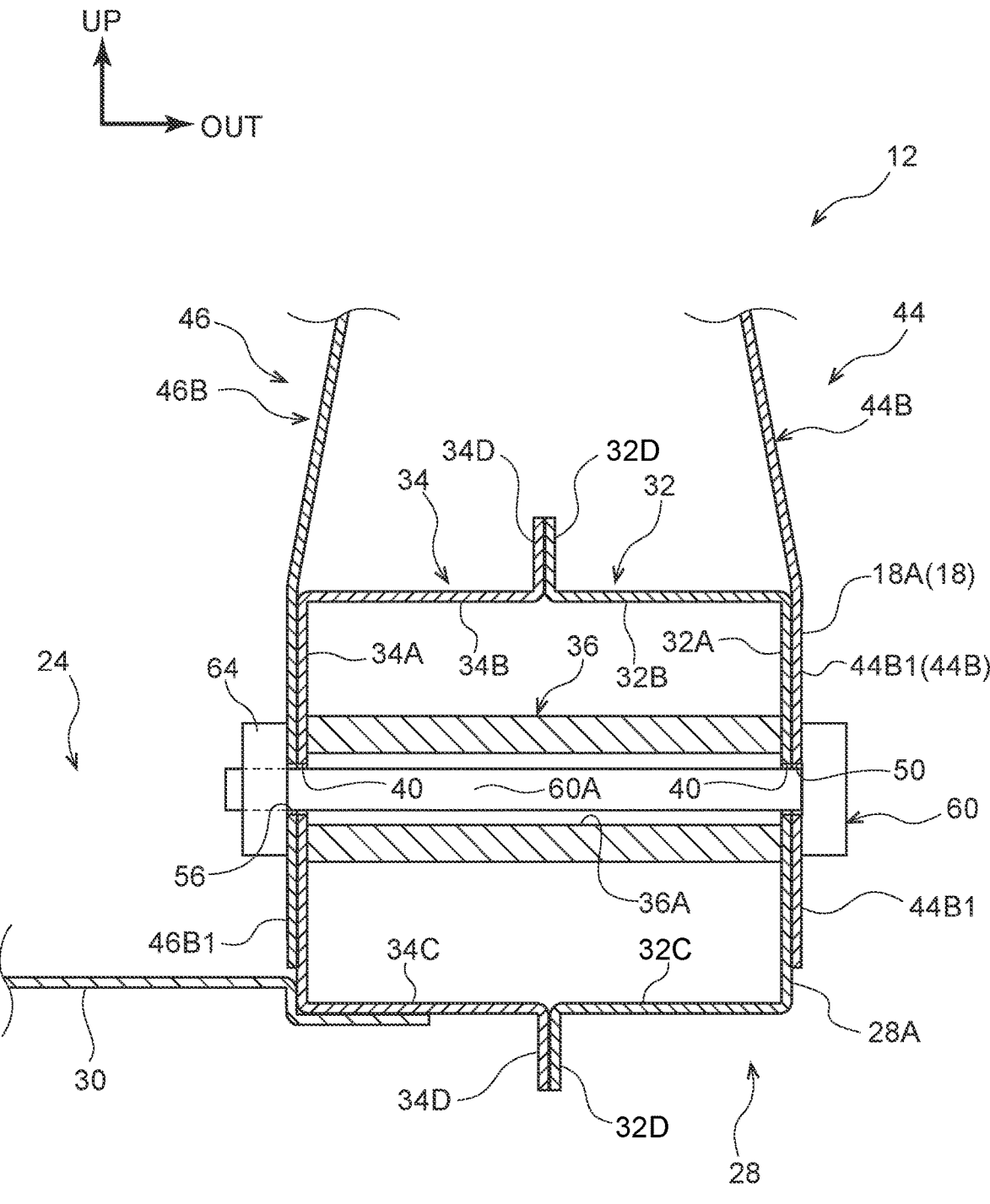
FIG. 3 is a cross-sectional view, seen from a vehicle front side, illustrating the configuration of the connection points between the center pillar and the rocker in the vehicle body to which the vehicle body structure according to the first exemplary embodiment has been applied, and is a cross-sectional view taken along line 3-3 in FIG. 1.
Figure 4:
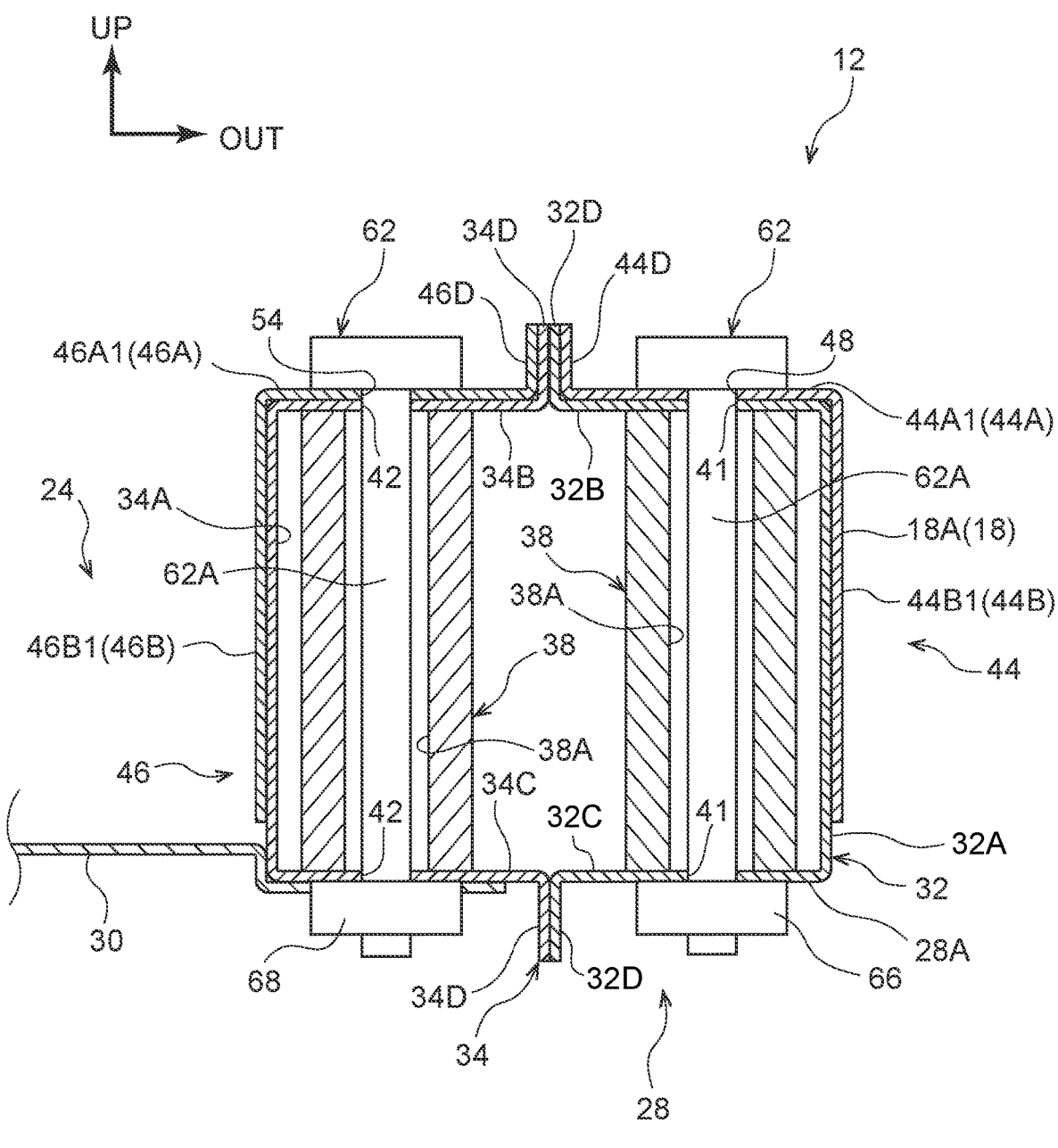
FIG. 4 is a cross-sectional view, seen from the vehicle front side, illustrating the configuration of the connection points between the center pillar and the rocker in the vehicle body to which the vehicle body structure according to the first exemplary embodiment has been applied, and is a cross-sectional view taken along line 4-4 in FIG. 1.

First, explanation follows regarding a configuration of the floor section 24. As illustrated in FIG. 3 and FIG. 4, the floor section 24 is formed by pressing a steel plate, and includes a floor panel 30 that extends in a vehicle front-rear direction and a vehicle width direction as seen from a vehicle up-down direction. Further, a pair of rockers 28 are disposed at outer sides in the vehicle width direction of the floor panel 30 so as to extend along respective peripheral edge portions of the outer sides of the floor panel 30.

The rocker 28 is configured to include a rocker outer member 32 that extends in the vehicle front-rear direction and configures a portion at an outer side in the vehicle width direction of the rocker 28, and a rocker inner member 34 that configures a portion at an inner side in the vehicle width direction of the rocker 28. It should be noted that the rocker outer member 32 and the rocker inner member 34 are each configured by pressing a steel plate.

More specifically, the rocker outer member 32 is configured to include a side wall section 32A, an upper wall section 32B, a lower wall section 32C, and a pair of flange sections 32D, and is configured in a hat shape in which a cross-sectional shape seen in the vehicle front-rear direction is open at an inner side in the vehicle width direction. The side wall section 32A configures a portion at a vehicle width direction outer side of the rocker outer member 32, and is plate-shaped so as to extend in the vehicle front-rear direction with a plate thickness direction thereof being the vehicle width direction. The upper wall section 32B extends toward a vehicle upward and inward side from a peripheral edge portion at an upper side of the side wall section 32A, and the lower wall section 32C extends toward a vehicle downward and inward side from a peripheral edge portion at a lower side of the side wall section 32A. Further, the flange sections 32D respectively extend toward the vehicle upper side from a peripheral edge portion of the upper wall section 32B, and toward the vehicle lower side from a peripheral edge portion of the lower wall section 32C.

The rocker inner member 34 is basically configured symmetrically to the rocker outer member 32 in the vehicle width direction. More specifically, the rocker inner member 34 is configured to include a side wall section 34A, an upper wall section 34B, a lower wall section 34C, and a pair of flange sections 34D, and is configured in a hat shape in which a cross-sectional shape seen in the vehicle front-rear direction is open at a vehicle width direction outer side.

Further, the flange sections 32D and the flange sections 34D are joined together at non-illustrated joining sections formed by welding or the like, whereby the rocker 28 has a closed cross-sectional structure in which a cross-sectional shape seen in the vehicle front-rear direction is a closed cross-section having a polygonal shape such as a substantially rectangular shape or a substantially hexagonal shape. It should be noted that a peripheral edge portion at an outer side in the vehicle width direction of the floor panel 30 is joined to the rocker inner member 34 at a non-illustrated joining section formed by welding or the like in a state in which this peripheral edge portion is in contact therewith from the vehicle lower side.

Figure 2:
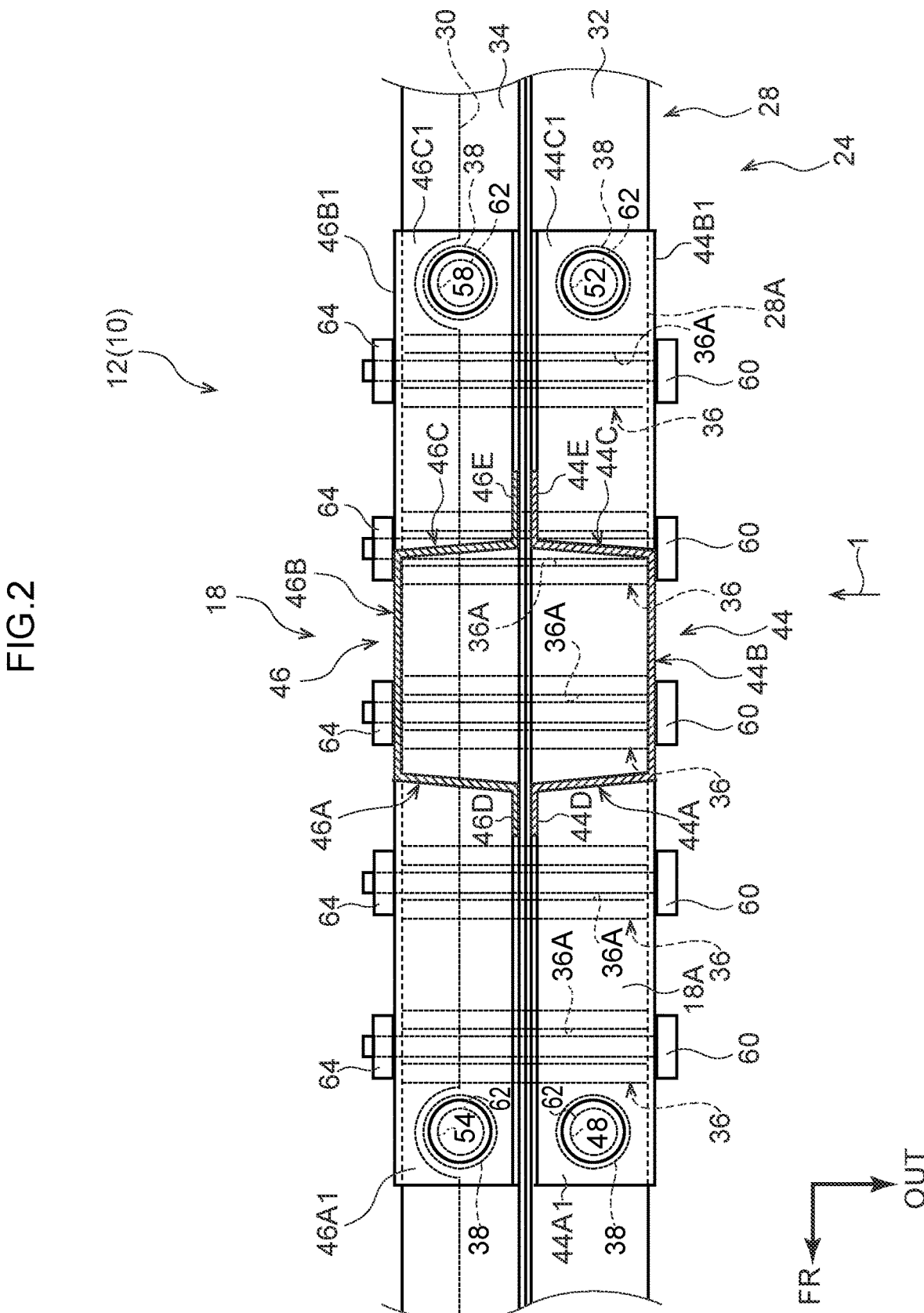
FIG. 2 is a cross-sectional view, seen from a vehicle upper side, illustrating the configuration of the connection points between the center pillar and the rocker in the vehicle body to which the vehicle body structure according to the first exemplary embodiment has been applied, and is a cross-sectional view taken along line 2-2 in FIG. 1.

Further, as illustrated in FIG. 1 and FIG. 2, a central section in the vehicle front-rear direction of the rocker 28 is configured as a connecting section 28A connected to the center pillar 18. Furthermore, a plurality of collars 36 each serving as a width direction supporting section and a plurality of collars 38 each serving as an up-down direction supporting section are disposed at an inside of the connecting section 28A.

As also illustrated in FIG. 3, each collar 36 is made of metal, for example, has a cylindrical shape, and is disposed with an axial direction thereof being the vehicle width direction. Namely, a penetrating section 36A serving as a width direction penetrating section formed at the collar 36 extends in the vehicle width direction. Further, plural collars 36 (five as an example) are disposed at predetermined intervals in the vehicle front-rear direction at a central section in the vehicle up-down direction of the rocker 28.

It should be noted that an end portion at a vehicle width direction outer side of the collar 36 is joined to the side wall section 32A of the rocker outer member 32, and an end portion at a vehicle width direction inner side of the collar 36 is joined to the side wall section 34A of the rocker inner member 34, at non-illustrated joining sections formed by welding or the like, respectively. Further, a penetrating section 40 is formed at a position overlapping with each penetrating section 36A in each of the side wall section 32A and the side wall section 34A.

Although each collar 38 is basically configured similarly to the collar 36, as also illustrated in FIG. 4, the collar 38 is disposed with an axial direction thereof being the vehicle up-down direction. Namely, a penetrating section 38A serving as an up-down direction penetrating section formed at the collar 38 extends in the vehicle up-down direction. Further, plural collars 38 (two as an example) are disposed at predetermined intervals in the vehicle width direction at each of a portion on one side of the connecting section 28A in the vehicle front-rear direction and a portion on the other side of the connecting section 28A in the vehicle front rear direction.

More specifically, these collars 38 are disposed so as to overlap with each other when seen in the vehicle width direction, and the collars 38 at the vehicle width direction outer side are joined at vehicle upper side end portions thereof to the upper wall section 32B of the rocker outer member 32, and at vehicle lower side end portions thereof to the lower wall section 32C of the rocker outer member 32, at non-illustrated joining sections formed by welding or the like, respectively. Further, a penetrating section 41 is formed at a position overlapping with each penetrating section 38A in each of the upper wall section 32B and the lower wall section 32C.

The collars 38 at the vehicle width direction inner side are joined at vehicle upper side end portions thereof to the upper wall section 34B of the rocker inner member 34, and at vehicle lower side end portions thereof to the lower wall section 34C of the rocker inner member 34, at non-illustrated joining sections formed by welding or the like, respectively. Further, a penetrating section 42 is formed at a position overlapping with each penetrating section 38A in each of the upper wall section 34B and the lower wall section 34C.

Returning to FIG. 2, the center pillar 18 is configured to include a pillar outer member 44 configuring a portion at a vehicle width direction outer side thereof, and a pillar inner member 46 configuring a portion at a vehicle width direction inner side thereof. It should be noted that the pillar outer member 44 and the pillar inner member 46 are each configured by pressing a steel plate. It should also be noted that, as a material for the center pillar 18, in addition to iron, various metals such as an aluminum alloy or the like can be adopted.

More specifically, as also illustrated in FIG. 1, the pillar outer member 44 is widened along a direction from a vehicle upper side toward a vehicle lower side, as seen in the vehicle width direction. Further, the pillar outer member 44 is configured to include a front wall section 44A configuring a portion at a vehicle front side thereof, an outer wall section 44B configuring a portion at a vehicle width direction outer side thereof, and a rear wall section 44C configuring a portion at a vehicle rear side thereof.

A main portion of the front wall section 44A has a plate shape extending in the vehicle up-down direction with a plate thickness direction thereof being the vehicle front-rear direction. A portion of the front wall section 44A configuring a lower section 18A of the center pillar 18 is positioned at a vehicle upper side of a portion at a vehicle front outer side of the connecting section 28A, with a plate thickness direction thereof being the vehicle up-down direction, and is in a state in which it is in contact with the connecting section 28A. It should be noted that this portion of the front wall section 44A is hereafter referred to as an upper side wall section 44A1. Further, a penetrating section 48 serving as an upper side insertion section is formed at a position in the upper side wall section 44A1 that overlaps with the penetrating section 38A of the collar 38, when seen in the vehicle up-down direction.

The outer wall section 44B extends in the vehicle up-down direction with a thickness direction thereof being the vehicle width direction, and a portion of the outer wall section 44B configuring the lower section 18A is positioned at a vehicle width direction outer side of the connecting section 28A, and is in a state in which it is in contact with the connecting section 28A. It should be noted that this portion of the outer wall section 44B is hereafter referred to as an outer side wall section 44B1. Further, a penetrating section 50 serving as an outer side insertion section is formed at a position in the outer side wall section 44B1 that overlaps with the penetrating section 36A of the collar 36, when seen in the vehicle width direction (refer to FIG. 3).

The main portion of the rear wall section 44C has a plate shape extending in the vehicle up-down direction with a plate thickness direction thereof being the vehicle front-rear direction. A portion of the rear wall section 44C configuring the lower section 18A is positioned at a vehicle upper side of a portion at a vehicle rear outer side of the connecting section 28A with a plate thickness direction thereof being the vehicle up-down direction, and is in a state in which it is in contact with the connecting section 28A. It should be note that this portion of the rear wall section 44C is hereafter referred to as an upper side wall section 44C1. Further, a penetrating section 52 serving as an upper side insertion section is formed at a position in the upper side wall section 44C1 that overlaps with the penetrating section 38A of the collar 38, when seen in the vehicle up-down direction.

It should be noted that a flange section 44D extends from a peripheral edge portion at a vehicle width direction inner side of the front wall section 44A toward the vehicle front side, and a flange section 44E extends from a peripheral edge portion at a vehicle width direction inner side of the rear wall section 44C toward the vehicle rear side.

As illustrated in FIG. 2, the pillar inner member 46 is basically configured symmetrically to the pillar outer member 44 in the vehicle width direction, and is configured to include a front wall section 46A configuring a portion at a vehicle front side thereof, an inner wall section 46B configuring a portion at a vehicle width direction inner side thereof, and a rear wall section 46C configuring a portion at a vehicle rear side thereof.

More specifically, a portion of the front wall section 46A configuring the lower section 18A is positioned at a vehicle upper side of a portion at a vehicle front inner side of the connecting section 28A with a plate thickness direction thereof being the vehicle up-down direction, and is in a state in which it is in contact with the connecting section 28A. It should be noted that this portion of the front wall section 46A is hereafter referred to as an upper side wall section 46A1. Further, a penetrating section 54 serving as an upper side insertion section is formed at a position in the upper side wall section 46A1 that overlaps with the penetrating section 38A of the collar 38, when seen in the vehicle up-down direction.

Further, a portion of the inner wall section 46B configuring the lower section 18A is positioned at a vehicle width direction inner side of the connecting section 28A, and is in a state in which it is in contact with the connecting section 28A. It should be noted that this portion of the inner wall section 46B is hereafter referred to as an inner side wall section 46B1. A penetrating section 56 serving as an inner side insertion section is formed at a position in the inner side wall section 46B1 that overlaps with the penetrating section 36A of the collar 36, when seen in the vehicle width direction (refer to FIG. 3).

Moreover, a portion of the rear wall section 46C configuring the lower section 18A is positioned at a vehicle upper side of a portion at a vehicle rear inner side of the connecting section 28A with a plate thickness direction thereof being the vehicle up-down direction, and is in a state in which it is in contact with the connecting section 28A. It should be noted that this portion of the rear wall section 46C is hereafter referred to as an upper side wall section 46C1. Further, a penetrating section 58 serving as an upper side insertion section is formed at a position in the upper side wall section 46C1 that overlaps with the penetrating section 38A of the collar 38, when seen in the vehicle up-down direction.

It should be noted that a flange section 46D extends from a peripheral edge portion at a vehicle width direction outer side of the front wall section 46A toward the vehicle front side, and a flange section 46E extends from a peripheral edge portion at a vehicle width direction outer side of the rear wall section 46C toward the vehicle rear side.

Further, the pillar outer member 44 and the pillar inner member 46 are integrated together by joining the flange section 44D to the flange section 46D, and joining the flange section 44E to the flange section 46E, at non-illustrated joining sections formed by welding or the like, respectively. It should be noted that the center pillar 18 configured as described above has a closed cross-sectional structure in which a cross-sectional shape seen in the vehicle up-down direction is a closed cross-section.

Further, as illustrated in FIG. 1 to FIG. 4, the lower section 18A of the center pillar 18 is connected to the connecting section 28A of the rocker 28 by plural bolts 60 each serving as a width direction attachment member and plural bolts 62 each serving as an up-down direction attachment member.

More specifically, a weld nut 64 is joined to the inner side wall section 46B1 of the pillar inner member 46 for each of the plural penetrating sections 56, from the vehicle width direction inner side at a non-illustrated joining section formed by welding or the like. Further, a shaft section 60A of a bolt 60 is fastened to the weld nut 64 in the vehicle width direction in a state in which the shaft section 60A is inserted through the penetrating section 50 of the pillar outer member 44, the penetrating sections 40 of the rocker 28, the penetrating section 36A of the collar 36, and the penetrating section 56 of the pillar inner member 46.

A weld nut 66 is joined to the lower wall section 32C of the rocker outer member 32 for each of the plural penetrating sections 41, from the vehicle lower side at a non-illustrated joining section formed by welding or the like. Further, a shaft section 62A of a bolt 62 is fastened to the weld nut 66 in the vehicle up-down direction in a state in which the shaft section 62A is inserted through the penetrating section 48 or the penetrating section 52 of the pillar outer member 44, the penetrating sections 41 of the rocker 28, and the penetrating section 38A of the collar 38.

Further, a weld nut 68 is joined to the lower wall section 34C of the rocker inner member 34 for each of the plural penetrating sections 42, from the vehicle lower side at a non-illustrated joining section formed by welding or the like. Furthermore, a shaft section 62A of a bolt 62 is fastened to the weld nut 68 in the vehicle up-down direction in a state in which the shaft section 62A of the bolt 62 is inserted through the penetrating section 54 or the penetrating section 58 of the pillar inner member 46, the penetrating sections 42 of the rocker 28, and the penetrating section 38A of the collar 38.

It should be noted that, in a state in which the lower section 18A of the center pillar 18 is connected to the connecting section 28A, a portion of the flange section 32D at the vehicle upper side of the rocker outer member 32 and a portion of the flange section 34D at the vehicle upper side of the rocker inner member 34 are in a state in which they are held between the pillar outer member 44 and the pillar inner member 46.

Further, although the upper section 18B of the center pillar 18 is connected to the roof section 14 in a similar manner as the lower section 18A, the upper section 18B may be joined to the roof section 14 at a non-illustrated joining section formed by welding or the like (refer to FIG. 5).

Operation and Effects of the Present Exemplary Embodiment

Next, explanation follows regarding operation and effects of the present exemplary embodiment.

In the present exemplary embodiment, as illustrated in FIG. 5, a portion at the outer side in the vehicle width direction of the floor section 24 is configured by the rocker 28, and the rocker 28 extends in the vehicle front-rear direction.

As illustrated in FIG. 1 and FIG. 2, the center pillar 18 is configured as a separate component from the rocker 28, and the lower section 18A of the center pillar 18 is detachably attached to the rocker 28. Consequently, the center pillar 18 can be detached from the floor section 24.

In a case such as when a main portion of the center pillar 18 is configured by a carbon fiber reinforced resin, it is difficult to repair the center pillar 18 or reuse the material configuring the center pillar 18.

In this regard, in the present exemplary embodiment, the center pillar 18 is configured of a steel material, and it is possible to perform welding work with respect to the center pillar 18 and to melt the members configuring the center pillar 18. Consequently, the center pillar 18 can be easily repaired, and new members can be easily manufactured from the material configuring the center pillar 18, as compared to a configuration in which the center pillar 18 is configured from a material that is difficult to reuse, such as a carbon fiber reinforced resin or the like.

Accordingly, the center pillar 18 can be easily replaced, and the center pillar 18 that has been detached from the vehicle body 12, and the materials configuring the center pillar 18, can be easily reused.

Further, as illustrated in FIG. 3, the cross-sectional shape of the rocker 28 as seen in the vehicle front-rear direction is a closed cross-section, and the collars 36 including the penetrating sections 36A extending in the vehicle width direction are disposed at the inside of the rocker 28.

The lower section 18A of the center pillar 18 includes the outer side wall section 44B1 positioned at the vehicle width direction outer side of the rocker 28, and the inner side wall section 46B1 positioned at the vehicle width direction inner side of the rocker 28.

Further, the rocker 28 and the lower section 18A of the center pillar 18 are connected in the vehicle width direction by the bolts 60 that are inserted through the penetrating sections 50 provided at the outer side wall section 44B1, the penetrating sections 56 provided at the inner side wall section 46B1, and the penetrating sections 36A of the collars 36. Consequently, connection points between the rocker 28 and the center pillar 18 can be consolidated in the vehicle width direction, and the rocker 28 and the center pillar 18 can be connected to each other without performing work for connecting the rocker 28 and the center pillar 18 at both the vehicle width direction outer side and the vehicle width direction inner side.

Accordingly, when the vehicle body 12 is configured such that the center pillar 18 and the rocker 28 are connected in the vehicle width direction, the number of man-hours for assembly of the vehicle body 12 can be reduced.

Further, as illustrated in FIG. 4, the collars 38 are disposed at the inside of the rocker 28, and the penetrating sections 38A extending in the vehicle up-down direction are formed at the collars 38.

The upper side wall section 44A1, the upper side wall section 44C1, the upper side wall section 46A1, and the upper side wall section 46C1 positioned at the vehicle upper side of the rocker 28 are provided at the lower section 18A of the center pillar 18. Further, the penetrating section 48 is provided at the upper side wall section 44A1, the penetrating section 52 is provided at the upper side wall section 44C1, the penetrating section 54 is provided at the upper side wall section 46A1, and the penetrating section 58 is provided at the upper side wall section 46C1.

Further, the rocker 28 and the lower section 18A of center pillar 18 are connected in the vehicle up-down direction by the bolts 62 that are inserted through each of the penetrating sections 48, 52, 54, and 58, and the penetrating sections 38A of the collars 38.

Consequently, the connection points between the rocker 28 and the center pillar 18 can be consolidated in the vehicle up-down direction, and the rocker 28 and the center pillar 18 can be connected to each other without performing work for connecting the rocker 28 and the center pillar 18 at both the vehicle upper side and the vehicle lower side.

Accordingly, in the present exemplary embodiment, when the vehicle body 12 is configured such that the center pillar 18 and the rocker 28 are connected in the vehicle up-down direction, an increase in the number of man-hours for assembly of the vehicle body 12 can be suppressed.

Further, in the present exemplary embodiment, as compared to a configuration such as when the center pillar 18 and the rocker 28 are joined together at a joining section formed by welding or the like, the number of man-hours required to release the connection state between the center pillar 18 and the rocker 28 can be reduced, and thus, the number of man-hours required to disassemble the vehicle body 12 can be reduced.

Second Exemplary Embodiment

Next, explanation follows regarding a vehicle body structure according to a second exemplary embodiment of the present disclosure, with reference to FIG. 6 to FIG. 10. It should be noted that the same reference numerals are allocated to constituent elements that are common to the aforementioned first exemplary embodiment, and explanation thereof is appropriately omitted.

Figure 7:
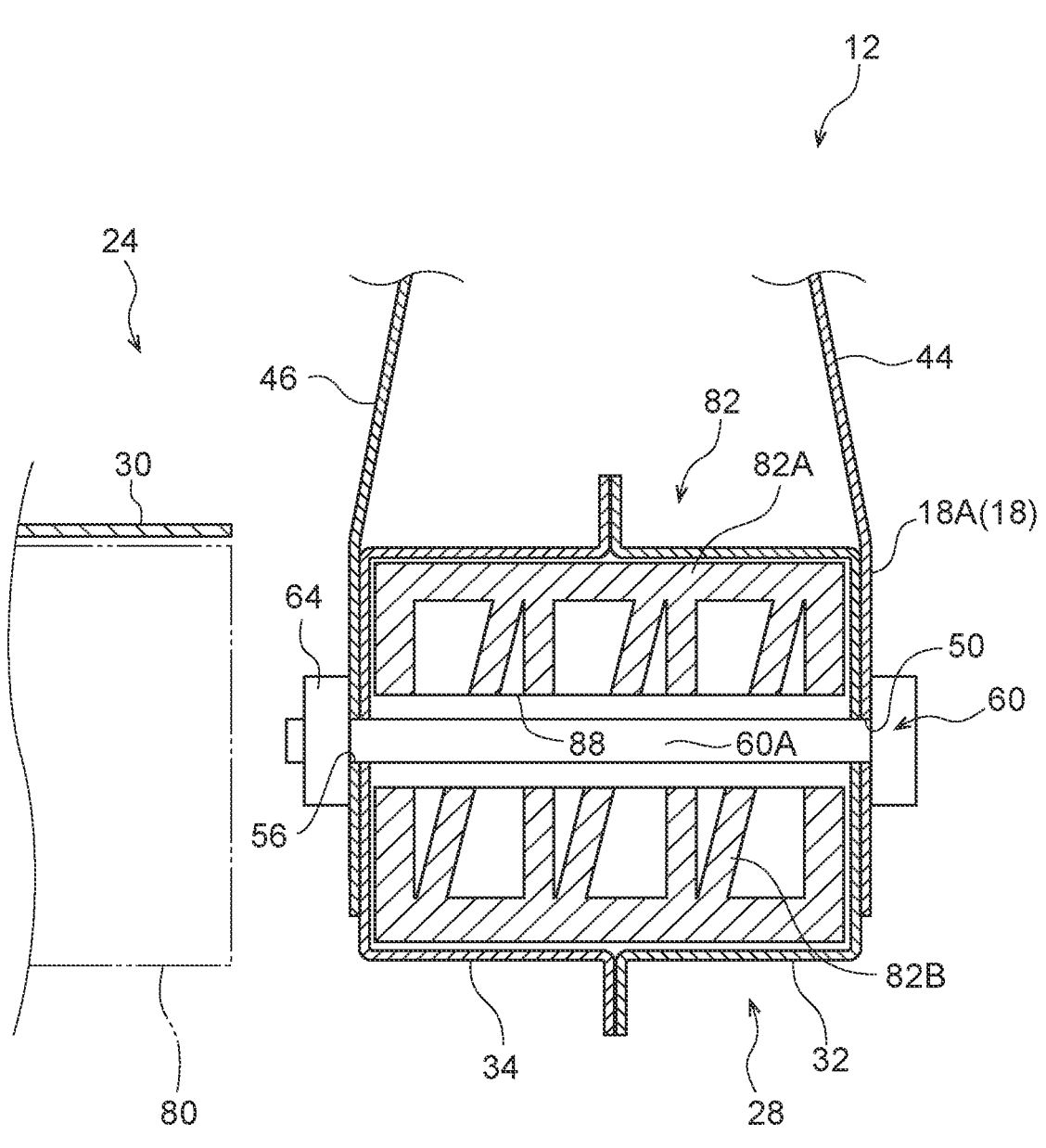
FIG. 7 is a cross-sectional view corresponding to FIG. 3, seen from the vehicle front side, illustrating the configuration of the connection points between the center pillar and the rocker in the vehicle body to which the vehicle body structure according to the second exemplary embodiment has been applied.

As illustrated in FIG. 7, the present exemplary embodiment is characterized in that a battery pack 80 is disposed between the pair of rockers 28, and in that a shock absorbing member 82 (hereafter referred to as an EA member 82) is disposed at the inside of the rocker 28, in place of the collars 36 and the collars 38.

Figure 10:
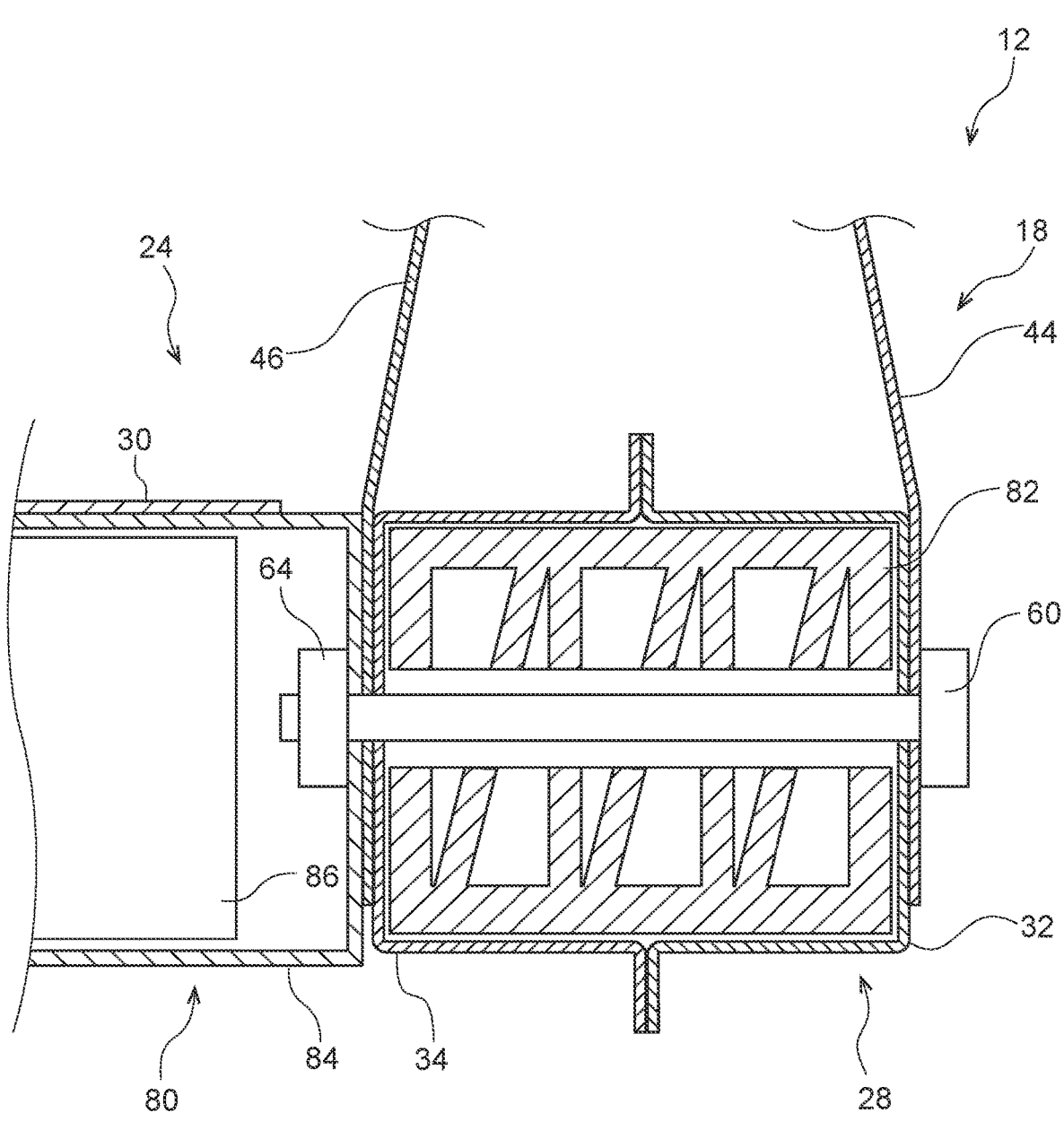
FIG. 10 is a cross-sectional view corresponding to FIG. 7, seen from the vehicle front side, illustrating a configuration of connection points between a center pillar and a rocker in a vehicle body to which a vehicle body structure according to a second modified example of the second exemplary embodiment has been applied.

More specifically, the battery pack 80 is configured to include a battery case 84 made of aluminum and configuring an outer shell thereof, and a battery module 86 disposed at an inner side of the battery case 84 (refer to FIG. 10).

Further, the floor panel 30 is joined to a portion at an upper side of the rocker 28, and the battery pack 80 is attached at a lower side of the floor panel 30. Furthermore, the battery pack 80 is disposed such that most of the battery pack 80 overlaps with the rocker 28 when seen in the vehicle width direction.

As an example, the EA member 82 is configured by an extruded material such as an aluminum alloy or the like, includes a square cylindrical outer wall section 82A extending in the vehicle front-rear direction and a partition wall section 82B provided at an inner side of the outer wall section 82A, and is capable of absorbing a collision load in a vehicle width direction. The EA member 82 is joined to the rocker 28 at a non-illustrated joining section formed by welding or the like.

Further, penetrating sections 88 each serving as a width direction penetrating section are formed at positions in the EA member 82 that overlap with the penetrating sections 50 and the penetrating sections 56 of the center pillar 18 when seen in the vehicle width direction, and a shaft section 60A of a bolt 60 is inserted through each penetrating section 88.

Figure 8:
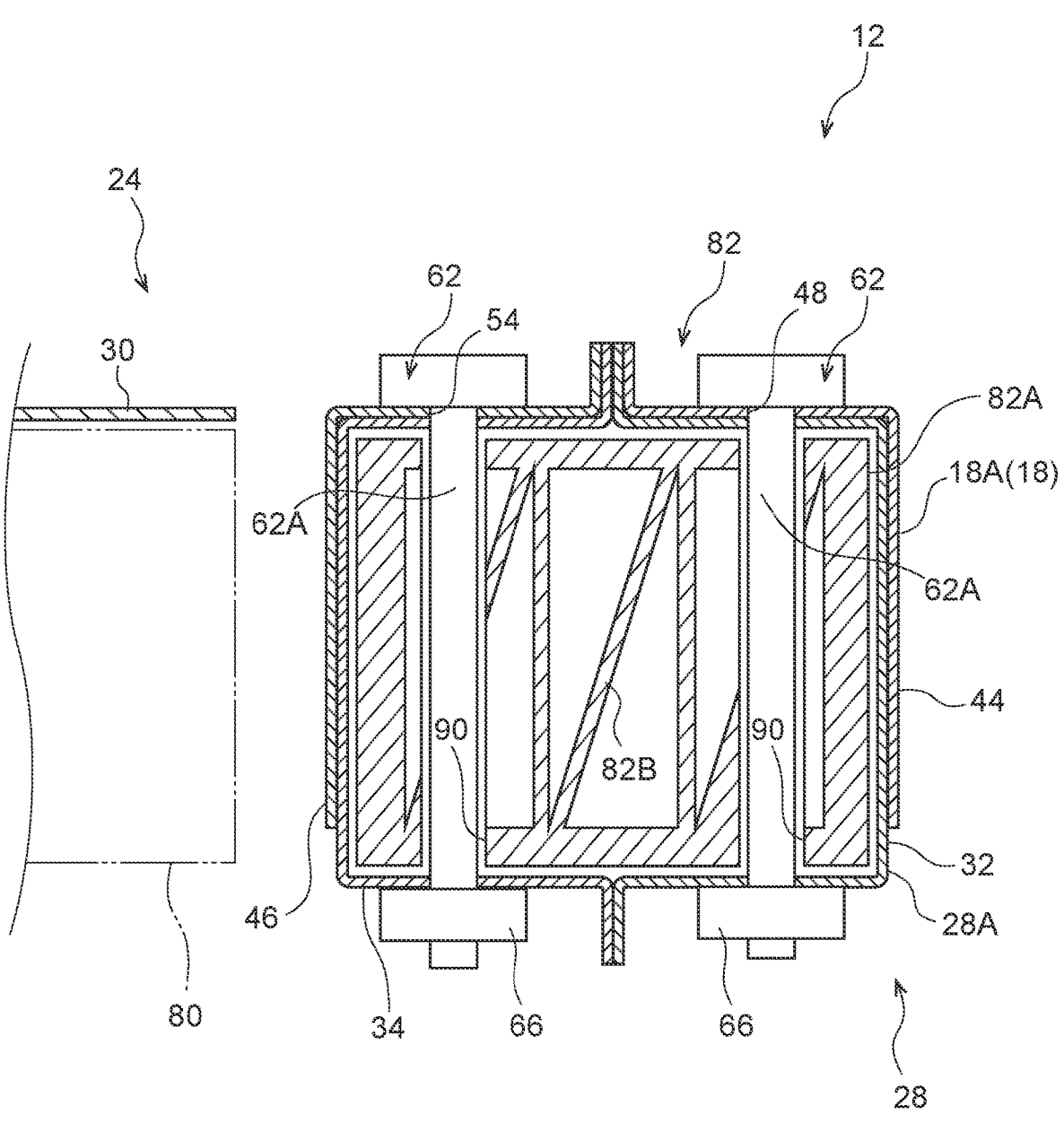
FIG. 8 is a cross-sectional view corresponding to FIG. 4, seen from the vehicle front side, illustrating the configuration of the connection points between the center pillar and the rocker in the vehicle body to which the vehicle body configuration according to the second exemplary embodiment has been applied.

As illustrated in FIG. 8, penetrating sections 90 each serving as an up-down direction penetrating section are formed at positions in the EA member 82 that respectively overlap with the penetrating sections 48, 52, 54, and 58 of the center pillar 18 when seen in the vehicle up-down direction, and a shaft section 62A of a bolt 62 is inserted through each penetrating section 90. Namely, in the present exemplary embodiment, the EA member 82 functions as a width direction supporting section and an up-down direction supporting section.

In the present exemplary embodiment configured as described above, the EA member 82 that is capable of absorbing a collision load in the vehicle width direction is disposed at an inside of the rocker 28. The battery pack 80 is disposed at a vehicle width direction inner side of the rocker 28, and the EA member 82 is disposed at a position that overlaps with the battery pack 80 when seen in the vehicle width direction.

Consequently, when a collision load in the vehicle width direction is input to the vehicle body 12, before the collision load is input to the battery pack 80, at least a portion of the collision load is absorbed by the EA member 82. Accordingly, in the present exemplary embodiment, the battery pack 80 can be protected from a collision load in the vehicle width direction.

First Modified Example of the Second Exemplary Embodiment

Figure 9:
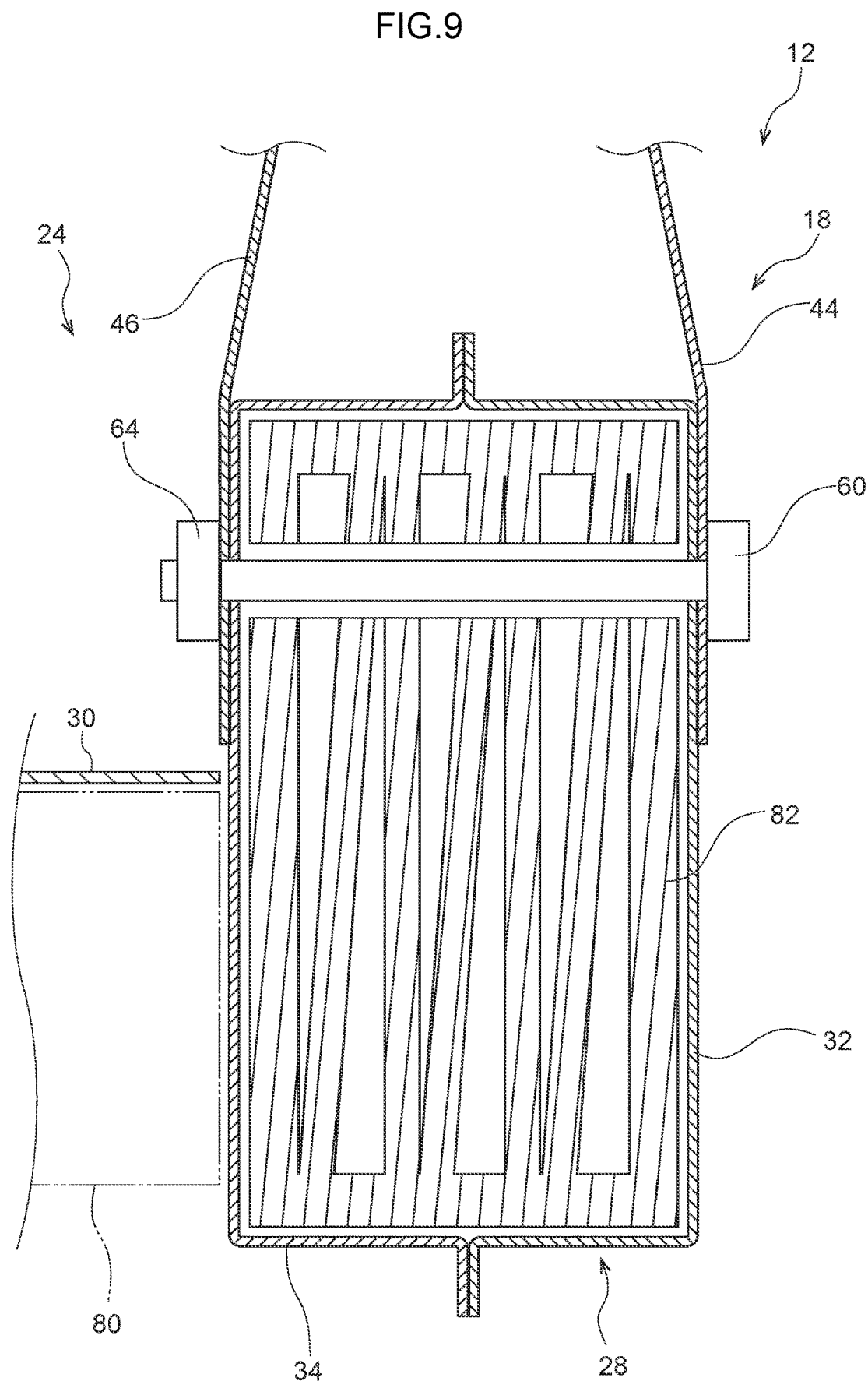
FIG. 9 is a cross-sectional view corresponding to FIG. 7, seen from the vehicle front side, illustrating a configuration of connection points between a center pillar and a rocker in a vehicle body to which a vehicle body structure according to a first modified example of the second exemplary embodiment has been applied.

Next, explanation follows regarding a vehicle body structure according to a first modified example of the second exemplary embodiment, with reference to FIG. 9.

Specifically, in the present modified example, the rocker 28 and the EA member 82 are extended in the vehicle up-down direction, and fastening points of the bolts 60 are changed to positions at which the bolts 60 and the battery pack 80 do not overlap with each other when seen in the vehicle width direction.

According to such a configuration, the battery pack 80 can be enlarged in the vehicle width direction, and, as a result, a capacity of the battery pack 80 can be secured. Second Modified Example of the Second Exemplary Embodiment Next, explanation follows regarding a vehicle body structure according to a second modified example of the second exemplary embodiment, with reference to FIG. 10.

Specifically, in the present modified example, positions of the weld nuts 64 that were provided at the inner side wall section 46B1 of the pillar inner member 46 are changed to a face at an inner side in the vehicle width direction of the side wall section 84A of the battery case 84. The side wall section 84A configures a portion at a vehicle width direction outer side of the battery case 84.

According to such a configuration, the rocker 28 and the battery pack 80 can be brought close together, and, as a result, capacity of the battery pack 80 can be secured.

Supplementary Explanation of the Exemplary Embodiments (1) Although the bolts 60 serving as the width direction attachment member are disposed at only one position in the vehicle up-down direction in the exemplary embodiments described above, a configuration may be adopted in which the bolts 60 are disposed at plural positions in the vehicle up-down direction, in accordance with specifications or the like of the vehicle 10. For example, a configuration may be adopted in which the rocker 28 and the EA member 82 are extended in the vehicle up-down direction as in the first modified example of the second exemplary embodiment, the outer side wall section 44B1 is extended in the vehicle up-down direction, and two of the bolts 60 are arranged in the vehicle up-down direction.

(2) Further, although the center pillar 18 and the rocker 28 are connected using the bolts 60 and the bolts 62 in the exemplary embodiments described above, there is no limitation thereto. Namely, depending on the specifications or the like of the vehicle 10, a configuration may also be adopted in which the bolts 62 are not used to connect the center pillar 18 and the rocker 28. Furthermore, a configuration may also be adopted in which weld nuts are respectively provided at faces, at the inner side of the rocker 28, of the side wall section 32A and the side wall section 34A of the rocker 28, and bolts are fastened to these weld nuts from the outer side of the center pillar 18, to thereby connect the center pillar 18 and the rocker 28.

(3) Moreover, although the bolts 60 and the bolts 62 are fastened to the weld nuts in the exemplary embodiments described above, nuts that are separate from the vehicle body 12 and that are not weld nuts may be fastened to the bolts 60 and the bolts 62 in accordance with the specifications or the like of the vehicle 10.

(4) In addition, although the collars or the shock absorbing member are disposed at the inside of the rocker 28 in the exemplary embodiments described above, a configuration may also be adopted in which the collars or the shock absorbing member are not disposed at the inside of the rocker 28 in accordance with the specifications or the like of the vehicle 10.

What is claimed is:

1. A vehicle body structure comprising:
a rocker configuring a portion at an outer side, in a vehicle width direction, of a vehicle body lower section, the rocker extending in a vehicle front-rear direction; and
a metal center pillar, which is a separate component from the rocker, a lower section in a vehicle up-down direction of the center pillar being detachably attached to the rocker by an attachment member, wherein:
a cross-sectional shape of the rocker seen in the vehicle front-rear direction is a closed cross-section,
the vehicle body structure further comprises a width direction supporting section that is disposed at an inside of the rocker, and the width direction supporting section includes a penetrating section extending in the vehicle width direction, the rocker and the center pillar are connected, in the vehicle width direction, by a width direction attachment member serving as the attachment member, and
the width direction attachment member extends horizontally within the penetrating section of the width direction supporting section between an outer side wall section and an inner side wall section of the rocker.

2. The vehicle body structure according to claim 1, wherein:
the lower section of the center pillar includes an outer side wall section positioned at an outer side, in the vehicle width direction, of the rocker, and an inner side wall section positioned at an inner side, in the vehicle width direction, of the rocker; and
the width direction attachment member being inserted through an outer side insertion section provided at the outer side wall section, an inner side insertion section provided at the inner side wall section, and the penetrating section of the width direction supporting section.

3. The vehicle body structure according to claim 2, wherein:
the width direction supporting section is configured as a shock absorbing member that is capable of absorbing a collision load in the vehicle width direction; and
the width direction supporting section is configured to be disposed at a position overlapping with a battery pack, which is disposed at an inner side in the vehicle width direction of the rocker, when seen in the vehicle width direction.

4. The vehicle body structure according to claim 3, further comprising an up-down direction supporting section that is disposed at an inside of the rocker, and at which a penetrating section extending in the vehicle up-down direction is formed, wherein:
an upper side wall section positioned at an upper side of the rocker is provided at the lower section of the center pillar; and
the rocker and the lower section of the center pillar are connected, in the vehicle up-down direction, by an up-down direction attachment member serving as the attachment member, the up-down direction attachment member being inserted through an upper side insertion section provided at the upper side wall section and the penetrating section.

5. The vehicle body structure according to claim 4, wherein the up-down direction supporting section is configured as a shock absorbing member.

6. The vehicle body structure according to claim 3, wherein the width direction attachment member is configured to connect the battery pack to the rocker.

7. The vehicle body structure according to claim 2, further comprising an up-down direction supporting section that is disposed at an inside of the rocker, and at which a penetrating section extending in the vehicle up-down direction is formed, wherein:
an upper side wall section positioned at an upper side of the rocker is provided at the lower section of the center pillar; and
the rocker and the lower section of the center pillar are connected, in the vehicle up-down direction, by an up-down direction attachment member serving as the attachment member, the up-down direction attachment member being inserted through an upper side insertion section provided at the upper side wall section and the penetrating section.

8. The vehicle body structure according to claim 1, further comprising an up-down direction supporting section that is disposed at an inside of the rocker, and at which a penetrating section extending in the vehicle up-down direction is formed, wherein:

an upper side wall section positioned at an upper side of the rocker is provided at the lower section of the center pillar;

the rocker and the lower section of the center pillar are connected, in the vehicle up-down direction, by an up-down direction attachment member serving as the attachment member, the up-down direction attachment member being inserted through an upper side insertion section provided at the upper side wall section and the penetrating section, and the up-down direction attachment member extends vertically within the penetrating section of the up-down direction supporting section between the upper side wall section and a lower side wall section of the rocker.

\* \* \* \* \*